US007698287B2

(12) United States Patent
Becker et al.

(10) Patent No.: US 7,698,287 B2
(45) Date of Patent: Apr. 13, 2010

(54) DESIGN OF SPREADSHEET FUNCTIONS FOR WORKING WITH TABLES OF DATA

(75) Inventors: Andrew J. Becker, Bellevue, WA (US); Charles D. Ellis, Seattle, WA (US); Joseph M. Chirilov, Kirkland, WA (US); Juha P. Niemisto, Mercer Island, WA (US); Matthew J. Androski, Bellevue, WA (US); Robert C. Collie, Kirkland, WA (US); Robert G. Hawking, Seattle, WA (US); Simon Peyton-Jones, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 597 days.

(21) Appl. No.: 10/957,502

(22) Filed: Sep. 30, 2004

(65) Prior Publication Data
US 2006/0075328 A1 Apr. 6, 2006

(51) Int. Cl.
G06F 17/00 (2006.01)
G06F 17/30 (2006.01)
(52) U.S. Cl. .......................... 707/101; 707/7
(58) Field of Classification Search ................. 707/101, 707/3, 7, 503; 715/503
See application file for complete search history.

(56) References Cited

U.S. PATENT DOCUMENTS

| 5,557,787 | A   | * | 9/1996  | Shin et al. ............... 707/102 |
| 5,603,021 | A   | * | 2/1997  | Spencer et al. ............. 707/4 |
| 5,842,180 | A   | * | 11/1998 | Khanna et al. ............ 705/30 |
| 5,890,174 | A   |   | 3/1999  | Khanna |
| 6,341,292 | B1  | * | 1/2002  | Cho et al. ................... 707/203 |
| 6,460,059 | B1  | * | 10/2002 | Wisniewski ................ 715/212 |
| 6,510,420 | B1  | * | 1/2003  | Cessna et al. ............... 706/45 |
| 6,631,497 | B1  | * | 10/2003 | Jamshidi et al. ............ 715/514 |
| 6,738,770 | B2  | * | 5/2004  | Gorman ...................... 707/7 |
| 6,754,677 | B1  | * | 6/2004  | Cho et al. ................... 707/201 |
| 6,757,867 | B2  | * | 6/2004  | Bauchot et al. ............ 715/504 |
| 7,003,504 | B1  | * | 2/2006  | Angus et al. .................. 707/1 |
| 7,058,631 | B1  | * | 6/2006  | Pal ............................... 707/10 |
| 7,082,569 | B2  | * | 7/2006  | Voshell ........................ 715/503 |

(Continued)

OTHER PUBLICATIONS

Blattner et al., "Excel 2000 Database Functions Overview," [Online] Dec. 13, 2003, pp. 1-5, http://www.informit.com/articles/printerfriendly.asp?p=30213&r1=1.
Yasuda et al, "Using Spreadsheets," [Online] 1999, pp. 1-58, http://www.deanza.fhda.edu/accounting/excel.pdf.
European Search Report for EP 05 10 5344.

* cited by examiner

*Primary Examiner*—Shahid A Alam
*Assistant Examiner*—Joshua Bullock
(74) *Attorney, Agent, or Firm*—Merchant & Gould, P.C.

(57) ABSTRACT

The present invention provides several database formulas that can manipulate large sets of data. Each database formula is customizable and repeatable without user intervention. Thus, users may enter numerous options that can cover the user's desire for data output in certain forms or formats, select a set of input data, and consistently receive a set of output data. In some embodiments, the user may refer to the set of data semantically instead of specifying a range of cells to use in the database formula. Referring to the data semantically allows the database formulas to adjust to changes in the range of cells new data may occupy.

45 Claims, 8 Drawing Sheets

U.S. PATENT DOCUMENTS

| | | | |
|---|---|---|---|
| 7,089,261 B2 * | 8/2006 | Hladik, Jr. | 707/102 |
| 7,139,745 B2 * | 11/2006 | Nakamura et al. | 707/2 |
| 7,191,184 B2 * | 3/2007 | Laborde et al. | 707/101 |
| 7,266,763 B2 * | 9/2007 | Peyton-Jones et al. | 715/213 |
| 2002/0143780 A1 | 10/2002 | Gorman | |
| 2002/0169799 A1 | 11/2002 | Voshell | |

DESIGN OF SPREADSHEET FUNCTIONS FOR WORKING WITH TABLES OF DATA

TECHNICAL FIELD

The present invention relates generally to the field of spreadsheet applications. More particularly, the invention relates to the reorganization of data in a spreadsheet.

BACKGROUND OF THE INVENTION

To survive in the information age, businesses and organizations require useful information about their organizations, markets, and operations. Useful business information is usually a condensed collection of data that is easy to understand and easy to absorb. To create useful information, businesses and organizations generally acquire vast collections of data that come from numerous and disparate sources then condense and organize the data into more useful forms and formats. Businesses and organizations usually rely on software packages to condense, manipulate, or formulate the data into useful information. The software packages make the manipulation of the vast data collections possible and efficient. One of the most common software packages used to derive more useful information from data collections is the spreadsheet application, such as the Microsoft® Excel spreadsheet application offered by Microsoft® Corporation.

Some spreadsheet applications allow some manipulation of data using database operations. Database operations, such as sort or filter, allow the user to format, condense, or organize data within a spreadsheet. Within spreadsheet applications, such as the Microsoft® Excel spreadsheet application, the database operations are only available to the user as a one-time operation. The database operation is generally accessed through a drop down menu in the spreadsheet application. The menu selection generally opens an operation user interface to step the user through the process of using the database operation. Unfortunately, the user can employ the operations only once, and the user is given only a few options to change the way the database operations function. To repeat the database operation, the user must again select the operation from the menu and enter the options again. Thus, the database operations are generally not automatically repeatable and are not flexible.

These problems are exacerbated when the user is a large organization that wants to manipulate large collections of data that originate from several, disparate sources. Users who require complex, table-based, database operations in a spreadsheet application often turn to manually manipulating the data or creating macro code to prepare the data. The first option is often time-consuming, expensive, and error-prone because the solution requires manual intervention every time the data changes. To automate this process, a user could employ macrocode, such as that created by Visual Basic for Applications® program. Unfortunately, the syntax and organization of macrocode is difficult for most users of spreadsheet applications. The macrocode can also be difficult to maintain. Most users cannot decipher the actual code, and thus, users cannot correct errors and cannot adjust the solution in the future.

In addition, the users often introduce new data to the spreadsheet on a recurring or periodic basis. For instance, monthly sales data is incorporated into spreadsheet applications every month. The users must manipulate the data monthly to create the useful information about business performance during the past month. To accomplish the manipulation of the monthly data, the users must either use the numerous database operations every month, which is extremely time consuming and wasteful, use the manual operations mentioned above, which the user must often change to work with the new data, or create the macro code mentioned above that may work with a new set of data but is difficult to create.

SUMMARY OF THE INVENTION

The present invention relates to a suite of database functions that can be used to create "database formulas" that can manipulate data in a spreadsheet. Each database function has a number of definable parameters or arguments, and the database functions can be combined with other database functions, other spreadsheet functions, and other operators to create a customizable output. Thus, users may enter numerous options that can cover the user's desire for output data in certain forms or formats.

In embodiments of the present invention, the input into each database function is a set of data. A set of data can be an array of cells occupying two or more rows, two or more columns, or two or more columns and two or more rows. In embodiments of the present invention, the output of each database function can be a set of data. Thus, each database function can create new tables of data that output "bulk" data, data that has more than one data value. The database functions allow the user to create sets of data that vary in organization and size depending on how the database function operates on the input data.

In one embodiment of the present invention, a method for manipulating a table of data in a spreadsheet application comprises receiving one or more database functions, receiving a selection for input data from within the table of data, manipulating the input data according to the one or more database functions, and presenting the output data in the spreadsheet. In some embodiments, two or more of the database functions are received in an embedded database formula.

The present invention may include inputs into a spreadsheet and outputs from the spreadsheet. In one embodiment, the one or more of the database functions have one or more arguments. In a further embodiment, one of the arguments has a semantic reference. In some embodiments, the user provides the one or more arguments. In further embodiments, the one or more of the arguments include a column token. In one embodiment, one or more of the arguments includes a mathematical expression.

In some embodiments, the input data is a table of data. In embodiments of the present invention, the output data is a table of data. In some embodiments, presenting the output data causes one or more items of pre-existing data to move. In some embodiments, the output data occupies two or more cells in the spreadsheet.

The present invention also includes exemplary embodiments of database functions. In one embodiment, the database functions include a filter function, a sort formula, a remove duplicates formula, a table append formula, or a add column formula. In some embodiments, the filter function comprises comparing at least one item of data to a filter argument, and returning output data without any item from the input data that meets a filter argument. In some embodiments, the sort function comprises returning an organized set of output data according to one or more sort arguments. In some embodiments, the duplicate removal function comprises determining that two items of data in the input data, designated in an argument, are the same, and returning output data, wherein one of the two items of like data are removed. In some embodiments, the table append function comprises retrieving two sets of input data, and returning output data, wherein at least a portion of the first set of input data is appended to at least a portion of the second set of input data. In some embodiments, the column add function comprises creating a column of data from the input data according to one or more arguments, and returning output data, wherein the output data includes the input data and the column of data.

In embodiments of the present invention, manipulating the input data comprises receiving one or more arguments with one or more of the database functions, parsing out the one or more arguments and the one or more database functions, determining if one or more arguments or one or more database functions could be applied row-by-row, if one or more arguments or one or more database functions could be applied row-by-row, applying those arguments or those database functions to each row separately, and applying any remaining arguments or database functions. In further embodiments of the present invention, a first intermediate set of data is created from applying the arguments and database functions to each row separately. In some embodiments, one or more subsequent intermediate sets of data are created because of each remaining argument or database function applied to the first intermediate set of data or to one or more of the subsequent intermediate sets of data.

In embodiments of the present invention, a user interface for displaying output data provides for receiving one or more database functions to apply to a set of input data, receiving a selection of input data, and displaying output data after the database function has been applied to the input data.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently exemplary embodiments of the invention, and to the appended claims.

DETAILED DESCRIPTION OF THE INVENTION

The present invention will now be described more fully hereinafter with reference to the accompanying drawings, in which embodiments of the invention are shown. This invention, however, may be embodied in many different forms and should not be construed as limited to the embodiments set forth herein. Rather, these embodiments are provided so that this disclosure will be thorough and complete and will fully convey the scope of the invention to those skilled in the art.

In general, the present invention relates to embodiments of methods of applying database functions in spreadsheet applications. In accordance with embodiments of the present invention, the methods described herein may be executed as a set of computer instructions read and performed on a single, stand-alone computer system.

The present invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 1A:
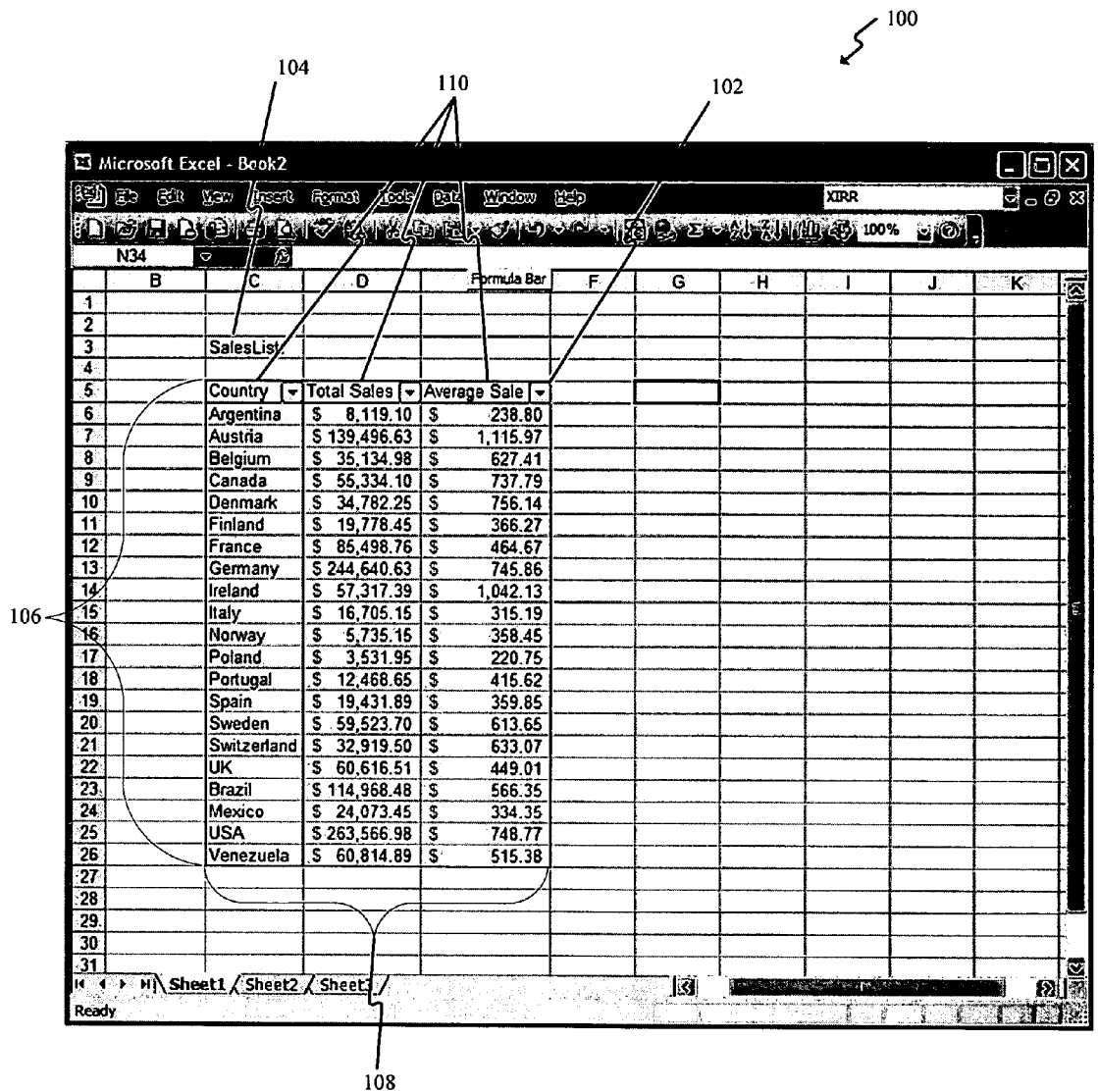
FIG. 1A, FIG. 1B, and FIG. 1C is a functional spreadsheet of an embodiment of the present invention illustrating the operational relationship between an exemplary database function, the input to the function, and the output from the function.
Figure 1B:
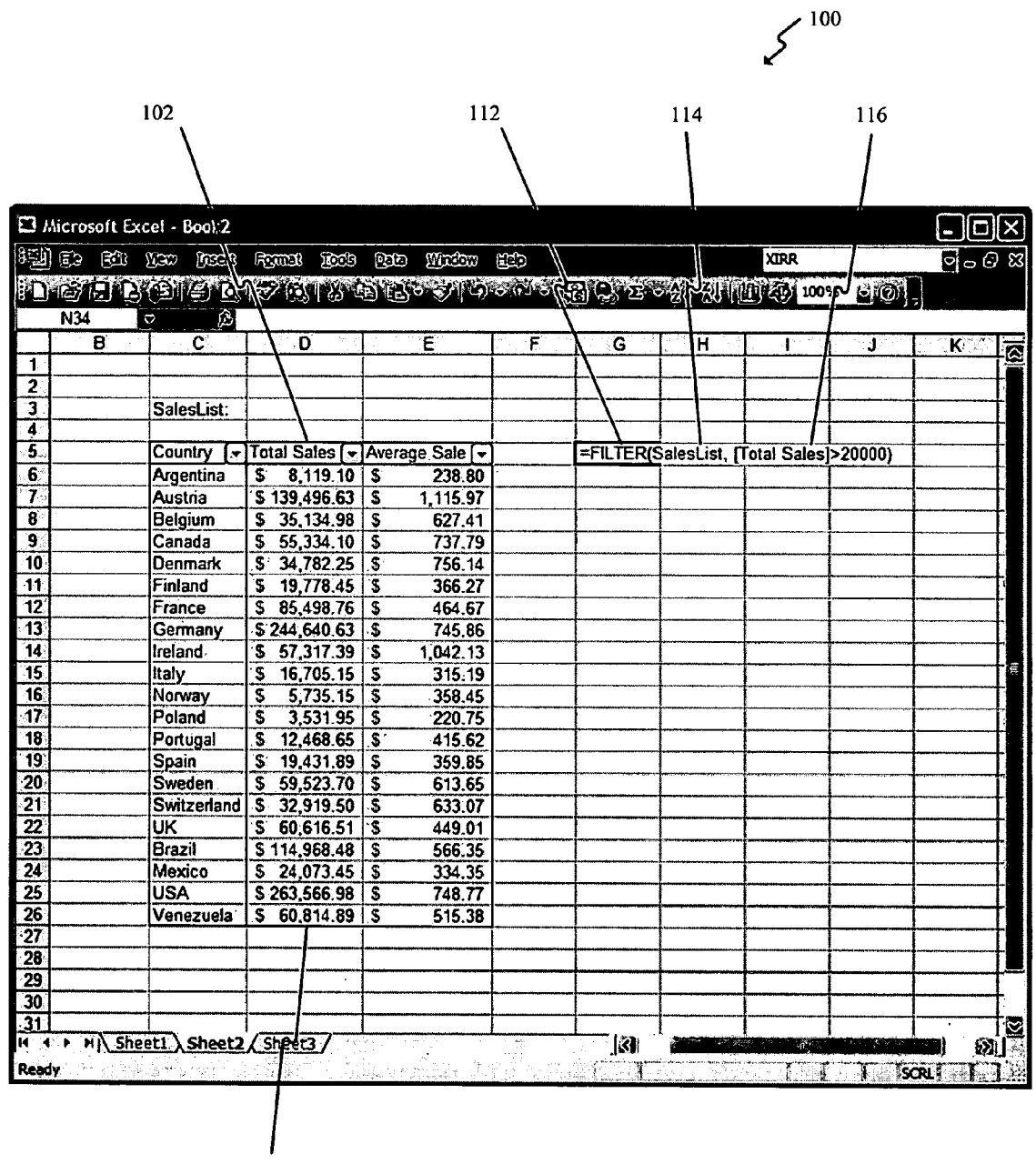
Figure 1C:
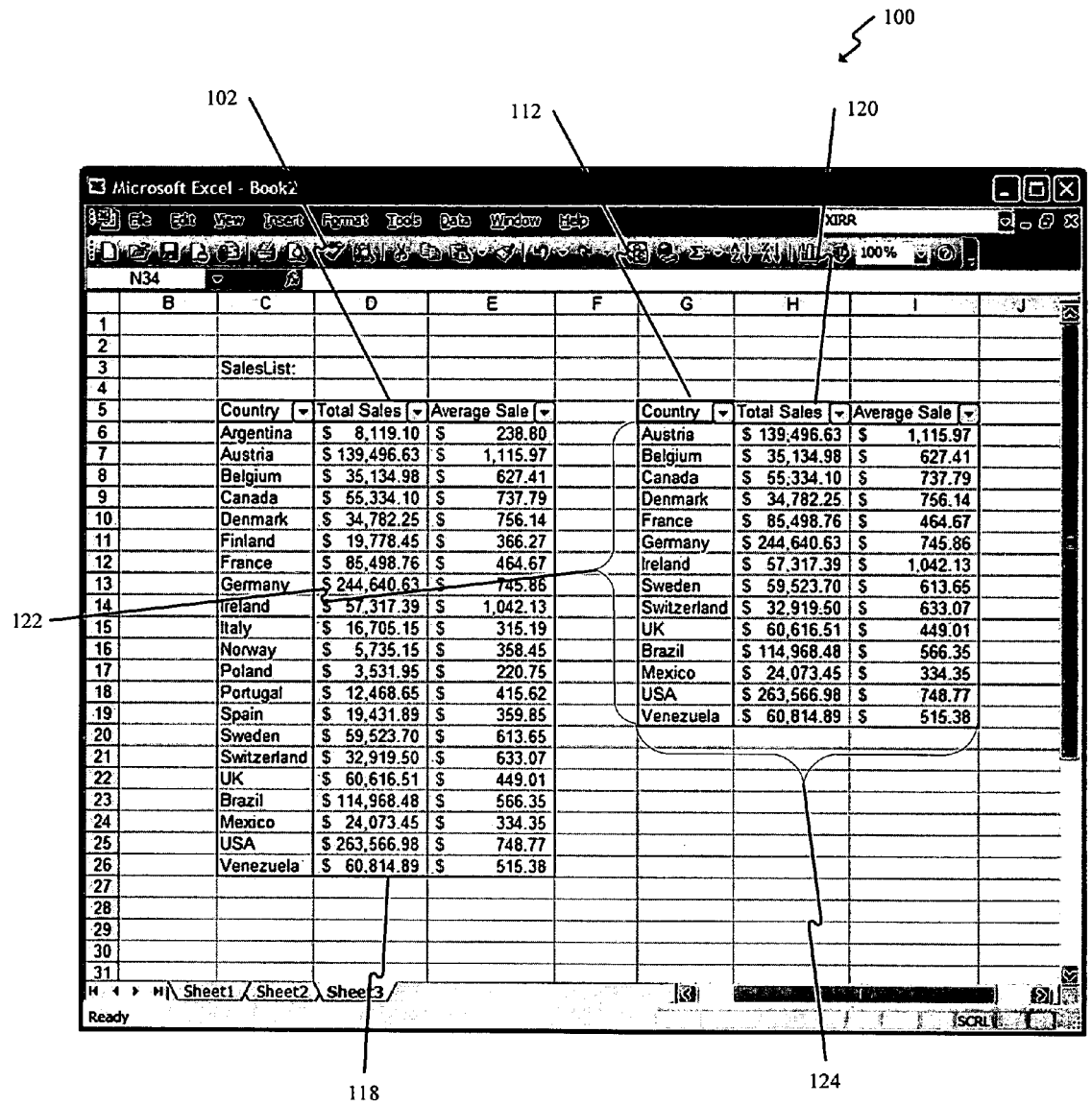

An exemplary spreadsheet application having aspects of the present invention is shown in FIG. 1A, FIG. 1B, and FIG. 1C. In embodiments of the present invention, a spreadsheet application or spreadsheet is a software application that can store data, make computations against data, and display data. Spreadsheets are organized as a workbook having one or more spreadsheets. Each spreadsheet has a plurality of cells that are formed from the intersection of a series of rows and a series of columns. An item of data may occupy a cell. A table of data is a collection of cells that occupy both multiple rows and multiple columns within a spreadsheet. Spreadsheets are well known in the art and will not be explained further.

An exemplary spreadsheet 100 is shown in FIG. 1A. The spreadsheet 100 contains a table of data 102. The table 102 has title 104 called "SalesList." The table 102 has 22 rows 106 from row 5 to row 26. The table 102 also has three columns 108 with column headers 110 in row 5, labeled: "Country," "Total Sales," and "Average Sales." The data is in column D and column E from row 6 to row 26.

A database formula having one or more database functions can be entered into the spreadsheet 100. In embodiments of the present invention, a database function is a function in a spreadsheet application that can retrieve an input set of data, manipulate that input data into another form or format, and produce an output set of data. A range of data or set of data is one or more items of data that occupy one or more cells of a spreadsheet. The database functions change the appearance or organization of the data. In general, the database functions reorganize the input data, eliminate items of data within the input data, or add data to the input data. In embodiments of the present invention, some database functions comprise sort, filter, table append, remove duplicates, and add a column. These particular embodiments will be explained in grater detail below, but the invention is not limited to these specific embodiments. In some embodiments of the present invention, the database functions are repeatable. In other words, as the input data changes, the database functions can be automatically rerun to provide updated output data.

In some embodiments, the input data need not have a set size but can change and update, and the database functions will adjust to the changes. In one embodiment, the database function can employ semantic designations. Semantically designating or a semantic designation refers to a particular way of selecting a set of data. Instead of giving a cell, row, or column reference, the user may use some type of language descriptor that the spreadsheet may use to find the spreadsheet data the user wants to select. For instance, if column C included all the ages of a group of children, the user could use a semantic designation to column C in an expression, like "[age]=3." The semantic designation, "age," is the column token in the argument. In embodiments of the present invention, a column token is a kind of argument that refers to a particular column. In the example above, the term "age" is the column token. The column token may be phrased in any manner that allows the spreadsheet to recognize a certain column and apply a formula or argument to that column. Semantic designations are explained in more detail in related U.S. patent application, "Method and Implementation for referencing dynamic data in spreadsheet applications," filed on Sep. 30, 2004, which is hereby incorporated by reference in its entirety.

The output of the database functions may be a set of data that can occupy one or more cells. Output data is the final set of data created from one or more applied database functions. In other words, after all database functions have been applied to the input data, the output data forms the final set of data. In one embodiment, the user or spreadsheet application does not need to define the size of the output data, the range of cells the output data will occupy, but the size of the output data is unbounded and can be completely reflective of the input and the effect of the database functions on that input data.

Each database function may have one or more customizable arguments or parameters that can adjust or adapt the execution of the database function. In embodiments of the present invention, an argument or arguments refers to the one or more expressions or modifiers to a database function. The arguments may adjust or adapt the formula to execute in a certain manner. Arguments can be in algebraic, Boolean, or other format. In one embodiment, an argument may refer to a cell. In embodiments of the present invention, an expression is a mathematical or logical symbol or a meaningful combination of symbols. In this description, an expression may refer to either a database function or an argument within the database formula.

In embodiments of the present invention, a database formula is a formula that makes use of one or more database functions to perform a series of database operations in a single formula definition. In embodiments of the present invention, an embedded database formulas or nested database formulas refers to the ability to place one or more database functions inside the syntax of a database formula. For example, a database formula may have the expression: "SORT(table 1(FILTER))." In the example of a database formula, the FILTER function is embedded within the SORT function. Embedding functions allows the user to create complicated expressions that manipulate the data in several ways without creating separate formulas.

An exemplary database formula 102 having a database function is shown in cell G5 112 of FIG. 1B. The exemplary database formula 112 includes a FILTER function. According to the arguments in the FILTER function, a filter will be applied to the table "SaleList" 102, according to the semantic reference 114 for table 102 in the database formula's arguments. The database formula 112 also includes another argument 116. The database formula 112 uses a semantic reference 116 for a column token, as can be seen by the argument 116 "[Total Sales]>20000". The column token points to the data in column D 118. The argument 116 requires that all rows of data whose data within column D that is not above the value 20000 should be removed from the final output data. Thus, the database formula 112 in this example will filter out all rows of data in the table "SalesList" 102 that do not have a Total Sales value above 20000.

Referring to FIG. 1C, the output data is shown in a second table 112 that occupies a set of rows 122, from row 5 through row 19, and a set of columns 124, from column G through column I. The output data table 112 is anchored at cell G5 where the user entered the database formula. As can be seen in FIG. 1C, the spreadsheet application eliminated 7 rows of data from the "SalesList" table 102 by applying the FILTER function to that table 102. The eliminated rows were all the rows that did not have a data value above 20000 in column D 118 of the SalesList table 102, which were rows 6, 11, 15, 16, 17, 18, and 19. The output data maintained the same number of columns, but changed the number of rows. The output data was placed in a range of cells rather than in the one cell where the database formula was entered.

In some embodiments, the process of manipulating data with the database function may end once the output data is displayed. In other embodiments, the output data from one database formula, having one or more database functions, may form the input for other spreadsheet functions or other database formulas, having one or more database functions. In some embodiments, the database formula or database function may be rerun repeatedly if the selected input data changes. Thus, the database formula or function reapplies and recreates the output data after any change to the designated input data. In essence, database functions can operate like other spreadsheet functions that can be recalculated upon a change in input data. The reapplication of the database functions and formulas is unlike the single application of database operations. Reapplication of the database formulas and database functions is described more fully above.

Figure 2:
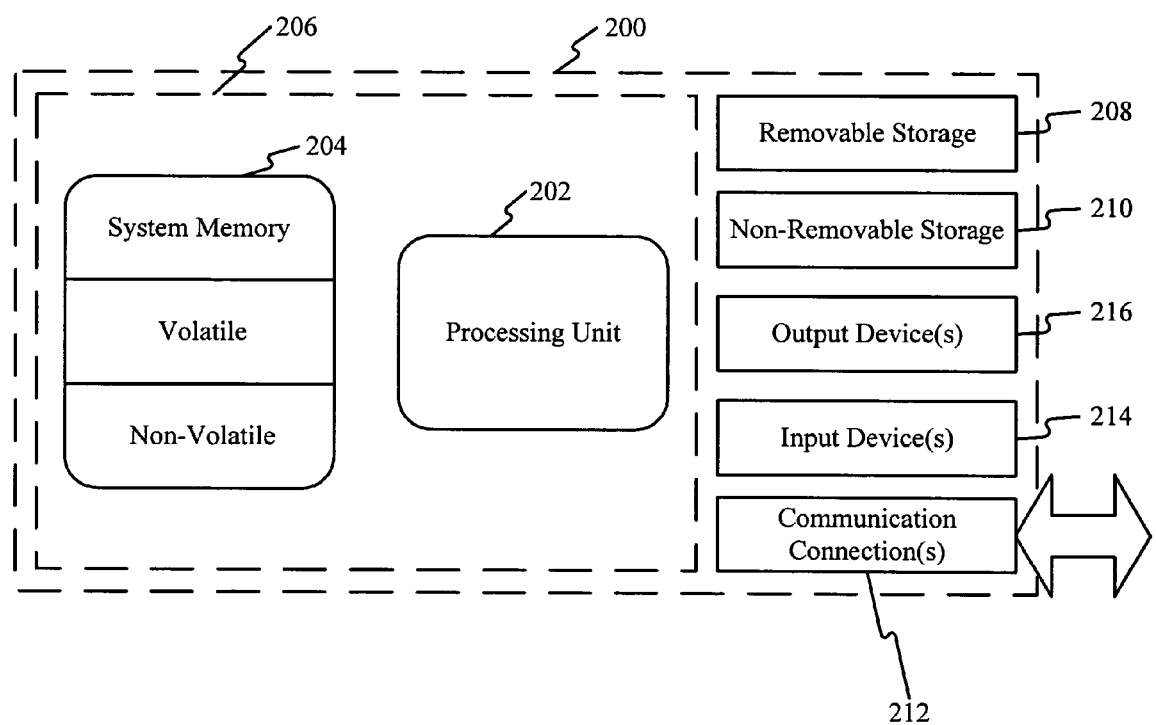
FIG. 2 shows a basic computer environment and computing device according to the present invention.

A suitable operating environment, in which the invention may be implemented, is depicted in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary system for implementing the invention includes a computing device, such as computing device 200. In its most basic configuration, computing device 200 typically includes at least one processing unit 202 and memory 204. Depending on the exact configuration and type of computing device 200, memory 204 may be volatile (such as RAM), non-volatile (such as ROM, flash memory, etc.) or some combination of the two. This most basic configuration of the computing device 200 is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules, or other data. Memory 204, removable storage 208, and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, which can be used to store the desired information and which can be accessed by the computing device 200. Any such computer storage media may be part of device 200.

Device 200 may also contain communication connection(s) 212 that allow the device 200 to communicate with other devices. Communication connection(s) 212 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Combinations of the any of the above should also be included within the scope of computer readable media. The term computer readable media as used herein includes both storage media and communication media.

Figure 3:
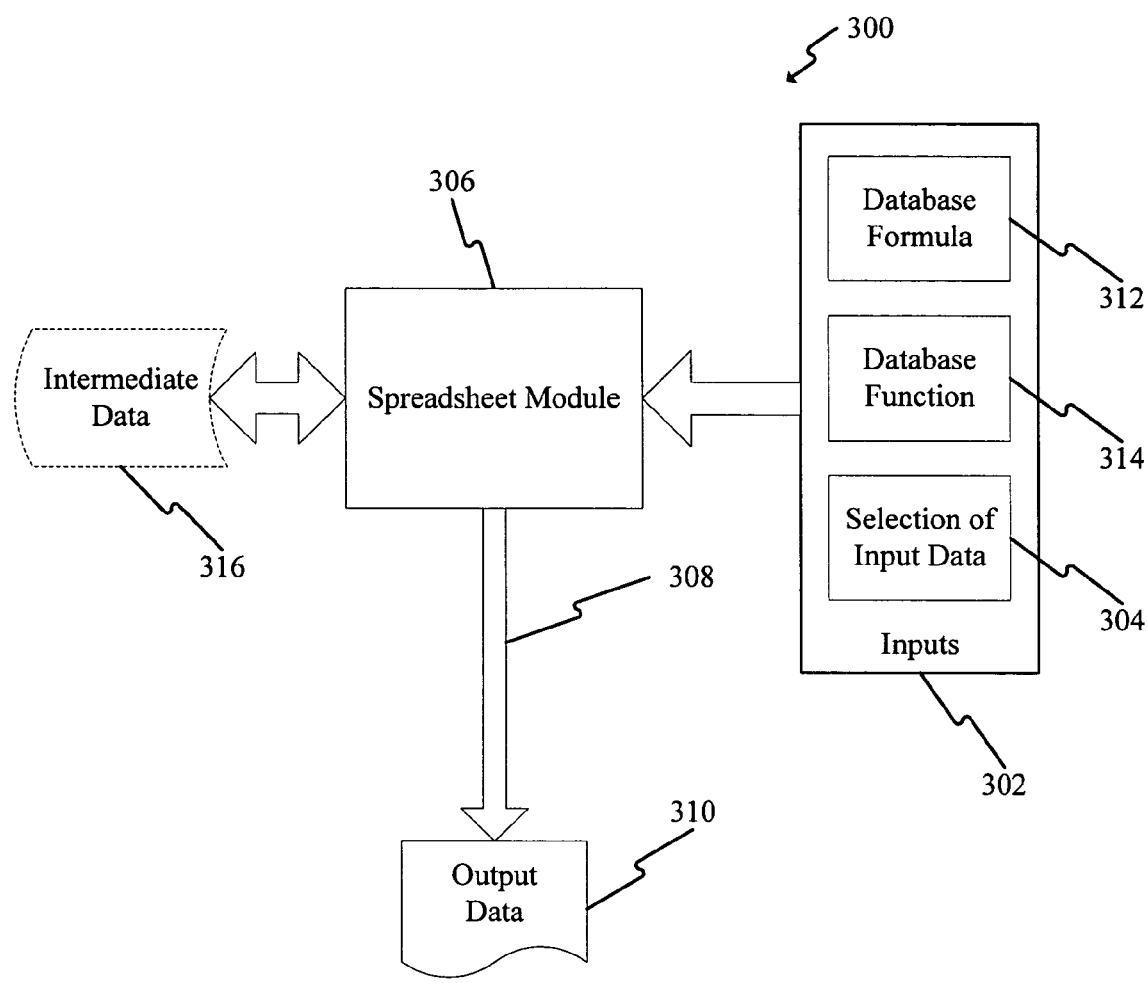
FIG. 3 shows a basic block diagram of one embodiment of the spreadsheet application including database functions according to the present invention.

A functional diagram of a spreadsheet application 300 having aspects of the present invention is shown in FIG. 3. The spreadsheet application 300 includes a spreadsheet module 306 that can accept user input 302. Spreadsheet module 100 is an embodiment of spreadsheet module 306. In embodiments of the present invention, the user input 302 can be one or more database functions 314, one or more database formulas 312 having one or more database functions, and/or a selection of a set of input data 304. Database formula 112 is an embodiment of database formula 312. Input data 102 is an embodiment of input data 304. The spreadsheet module 306 can apply database functions and database formulas. The spreadsheet module 306 can apply the database functions 314 or database formulas 312 to the set of input data 304. The spreadsheet module 306 can manipulate the input data 304 according to the database function 314 or database formula 312 and create a set of output data 310. Output data 120 is an embodiment of output data 310. In some embodiments, the spreadsheet module 306 can place the output data 310 into one or more cells within the spreadsheet. In other embodiments, the spreadsheet module 306 may use the output data in other functions or calculations. In some embodiments, the spreadsheet module 306 may create one or more intermediate set of data 316 before finally producing output data 310. An intermediate set of data 316 refers to a table or set of data that the spreadsheet must create between executions of successive or subsequent database functions 314 or arguments. Each successive database function 314 or argument can be applied to the most recent intermediate set of data 316.

The spreadsheet application 300 can accept database functions 314, whether in a database formula 312 or separate from the database formula 312, and perform database operations according to the database functions 314. In other words, the user can select or provide a database function 314 that manipulates the input data's form, format, organization, structure, or content. In some embodiments, the database functions 314 can be applied to an array of input data 304 including whole tables and can provide output data 310 as a separate array of data. In other embodiments, the database functions 314 are dynamic, in that the database functions 314 will rerun when the underlying input data 304 changes. Thus, the user need not manually reapply the database functions 314, but the database functions 314 will continually generate output data 310 from any ever-changing source of input data 304.

Figure 4:
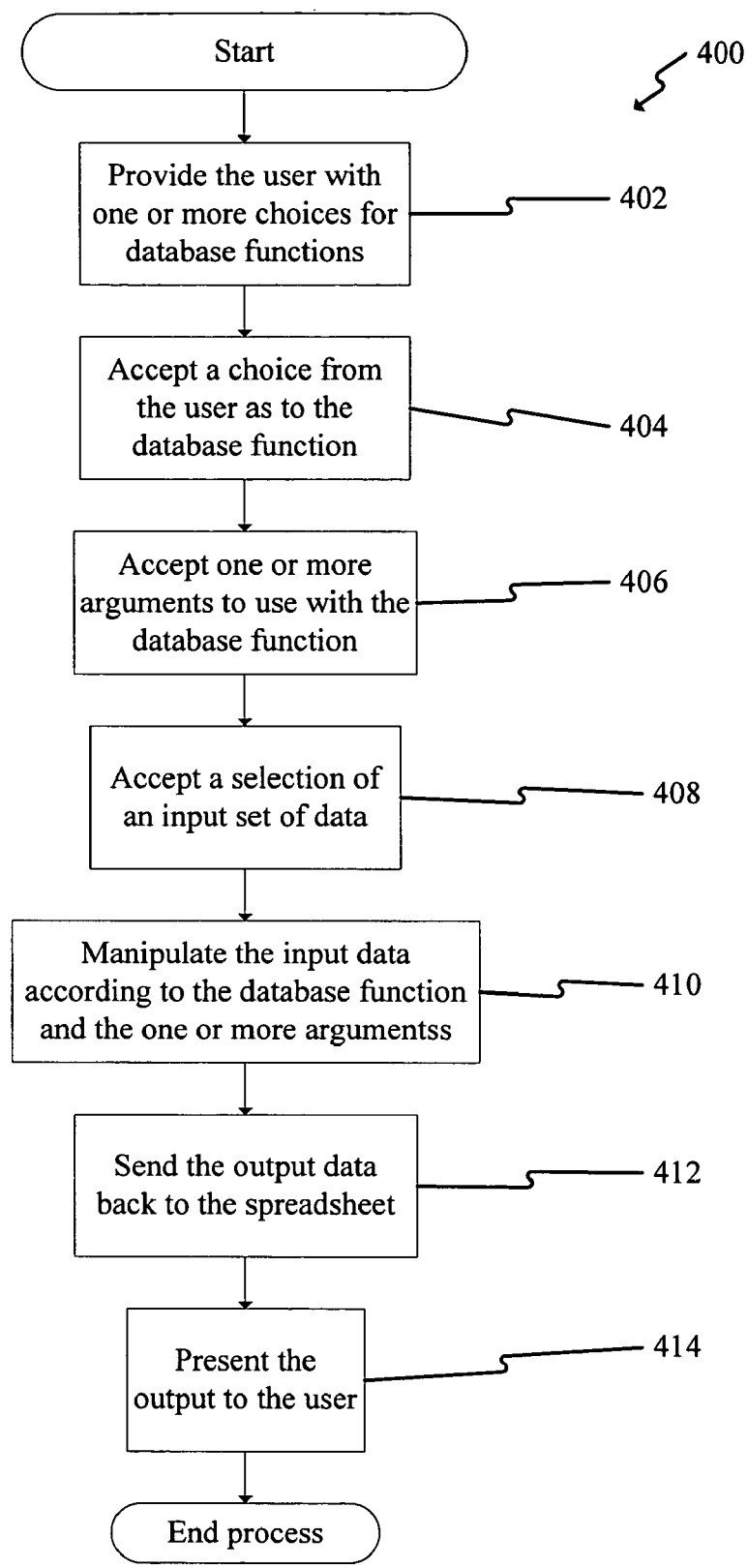
FIG. 4 shows an embodiment of a basic method of creating and employing a database function within a spreadsheet according to the present invention.

An embodiment of a method 400 for applying one or more database functions (such as database function 314) to a set of input data (such as input data 304) is shown in FIG. 4. First, a provide operation 402 provides the user with a choice of one or more database functions 314. In embodiments of the present invention, a spreadsheet module (such as spreadsheet module 306) may provide the database functions by making the database functions available to the user. In one embodiment, the spreadsheet module may provide a list of database functions, such as in a menu. In another embodiment, the spreadsheet module provides the database function by allowing the user to type the name of the database function into the spreadsheet (such as spreadsheet 300).

Next, an accept operation 404 accepts the user's entry of the database function. In embodiments of the present invention, a spreadsheet module can store the database function into the cell where the user entered the database function. In other embodiments, the spreadsheet module can store a database formula (such as database formula 312) containing a database function into a cell where the user entered the database formula.

Next, an accept operation 406 accepts one or more arguments. In embodiments of the present invention, an argument is an expression that adjusts or adapts the execution of the database function. In one embodiment, the arguments may be part of a larger database formula. In other embodiments, the arguments may be part of the database function syntax. The spreadsheet module can store the arguments with the database function.

Next, an accept operation 408 accepts a selection of a set of input data. The input data may be one or more cells of data. In one embodiment, the user may input a cell range for the input data. In another embodiment, the user may employ a semantic designation to refer to a set of input data. In still other embodiments, the user may employ a mouse or other graphical user interface input device to highlight and select the input data. The spreadsheet module can store this input data selection with the database function. Any correction needed to the database function, arguments, or input data selection may be prompted by the spreadsheet module and made by the user. In some embodiments, the user may enter the database function, input data selection, and one or more arguments as a single expression.

Next, manipulate operation manipulates the input data according to the one or more database functions. In embodiments of the present invention, the spreadsheet module executes the database functions, with the arguments, on the selected input data. The spreadsheet module manipulates the input data according to the type of database function and the accompanying arguments. As explained, manipulating the input data may mean any type of change to the organization or format of the input data. In one embodiment, a first database function or argument (meaning the first listed in any embedded database formula or first argument in a series of arguments) is executed on the input data. Then, the spreadsheet module proceeds through each successive function or argument in series order. In some embodiments, the spreadsheet outputs a set of intermediate data (such as intermediate set of data 316) after the application of each function or argument. The final function or argument creates the output data (such as output data 310).

For example, if a FILTER function and a sort formula are applied to the same table of data, the spreadsheet can first create an intermediate set of data, such as a second table of data after the filter operation but before the sort operation. The spreadsheet may store this intermediate set of data. Then, the spreadsheet may apply the sort formula to the intermediate set of data to create the output data. Any data created and/or stored between sequential or subsequent executions of formulas or expressions is an intermediate set of data. A more detailed description of an embodiment of a method for manipulating data with one or more database functions is described with reference to FIG. 5.

Next, a send operation 412 sends the output data to the spreadsheet. The output data may be a new table of data or set of data. In embodiments of the present invention, the spreadsheet module forms the output data. In one embodiment, the spreadsheet module produces the table with column and row headers. In one embodiment, the spreadsheet module may name the output data.

In one embodiment, the spreadsheet module determines the size and configuration of the output data. The spreadsheet module may determine how many rows and how many columns comprise the output data. Then, the spreadsheet module may determine if enough space exists in the spreadsheet to place the output data into the spreadsheet. In one embodiment, the spreadsheet module may find the cell where the database function or formula is anchored. The spreadsheet module may then check the rows and columns around the anchor cell for any existing data. If existing data exists, the existing data may be shifted to make room for the output data.

Next, a present operation 414 presents the output data. In embodiments of the present invention, the spreadsheet module displays the output data in the spreadsheet. The output data may form one cell of data, a range of data in a column or row, a table of data, or any other arrangement of data in any arrangement of cells or spreadsheets.

Figure 5:
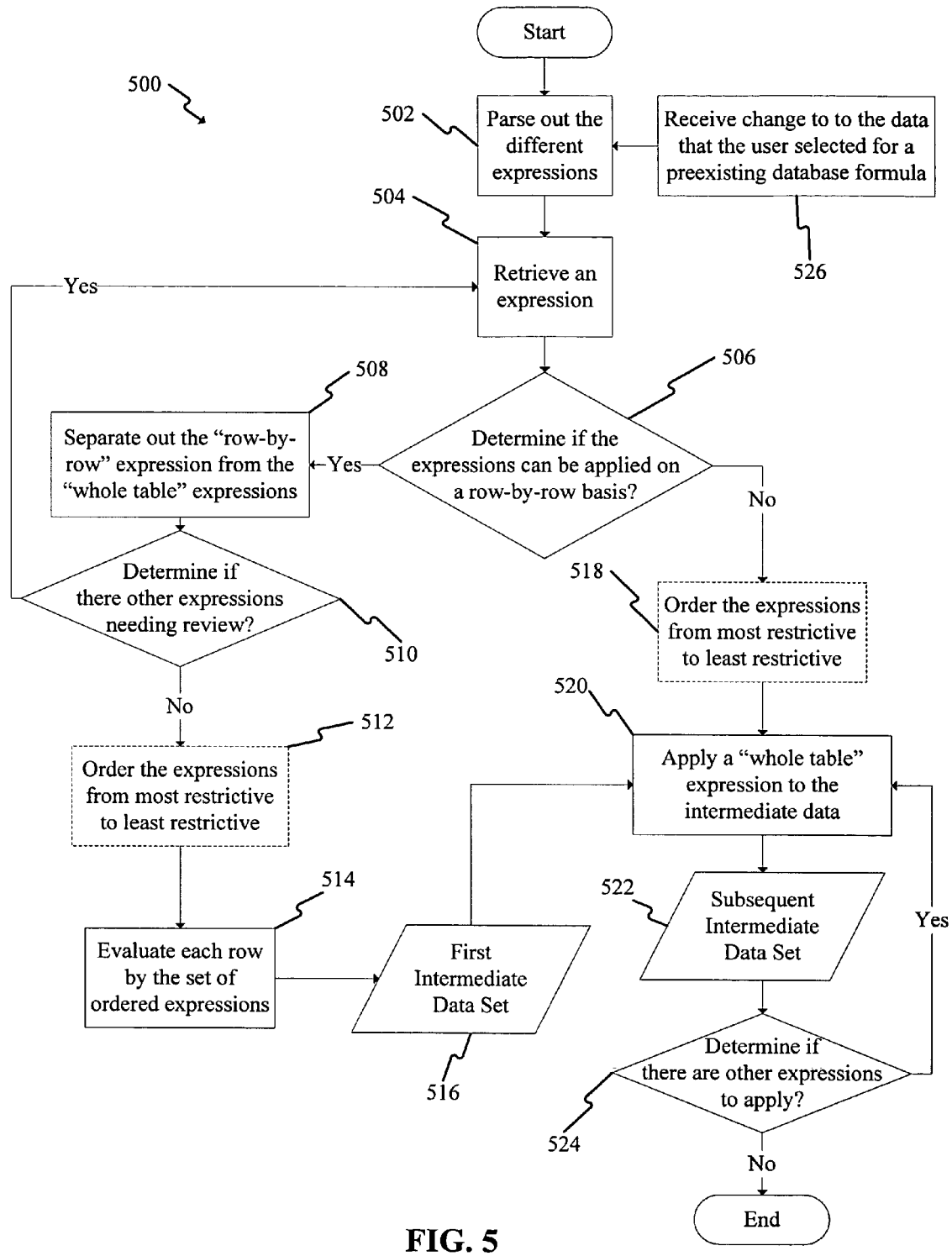
FIG. 5 shows another embodiment of a method of applying a database function to a set of data within a spreadsheet according to the present invention.

A further embodiment of a method 500 for manipulating input data (such as input data 304) with one or more database functions (such as database function 314) is shown in FIG. 5. First, a parse operation 502 parses the database formula (such as database formula 312) or database function. In embodiments of the present invention, a spreadsheet module (such as spreadsheet module 306) receives, from the user, one or more database formulas or functions that can include one or more arguments. In some embodiments, the user may provide a formulaic expression where one or more database functions are embedded in a database formula. As an example, the database formula expression received by the spreadsheet application may have a FILTER FUNCTION inside a SORT formula inside a REMOVE DUPLICATES formula. This formula expression may look like the following: "=Remove-Duplicates(Sort(Filter(Table1, [Column 1]="Product 1", [Sales]>1200), [Salesperson Name], 1), [Column 1], [Salesperson Name])."In this example, the formula results in the list being sorted by "salesperson," and filtered to include the products that the salesperson sold more than 1200 units in a single order, with duplicate salesperson/product name combinations removed.

In some embodiments, the embedded database formula can require the spreadsheet to parse the different expression, whether those expressions are database functions or arguments of the database functions. The database formulas, whether embedded or independent, may have one or more arguments. In one embodiment, the spreadsheet module can treat each expression as a separate database operation. Thus, each expression is separated and evaluated individually. The collection of database operations may be applied to the input data in any order and at any time in the process. Thus, rather than execute the expressions in series order, the spreadsheet module may change the order and/or the method of application of the database operations to optimize the execution of the database formula. In some embodiments, the parsed expressions may be stored for later access.

Next, a retrieve operation 504 retrieves a parsed expression. In some embodiments, the spreadsheet module can retrieve one of the stored parsed expressions. The spreadsheet module can access memory to call the expression and provide the expression for further evaluation. By retrieving the expressions one at a time, the spreadsheet module can reorder the execution of the database functions and arguments.

Next, determine operation 506 determines the class of the expression. In embodiments of the present invention, the expression may have one of two classes. First, the expression may be applied to a single row of data or be applied row-by-row. Second, the expression may be applied to a "whole table" of data and not to a single row. Certain database operations can be operated on a single row. For example, a filter operation that looks at a data value in one cell can be applied row-by-row. In contrast, certain database operations can be applied only to entire or "whole" tables of data. For example, a sort operation can be applied only to a whole table of data. Thus, in embodiments of the present invention, the spreadsheet module checks the expressions against a set of expressions that the spreadsheet module knows can be applied to single rows of data. If the expression is in the list, that expression may be applied immediately.

If the expression can be applied row-by-row, then separate operation 508 separates the row-by-row expressions. In one embodiment, the spreadsheet module separates out the expressions and stores the expressions as a separate group. In some embodiments, rather than store the expressions, the expressions are immediately applied in series order to each row of the input data. In other embodiments, the spreadsheet module stores every row-by-row expression for further evaluation before applying the expressions. Therefore, the spreadsheet module may separate out the expressions for later processing.

Next, determine operation 510 determines if there are other expressions to review. In embodiments of the present invention, the spreadsheet module may determine if all expressions have been reviewed for class, row-by-row or "whole table." If an expression has not been reviewed the process 500 returns to retrieve operation 504. However, if there are no other expressions needing review, the process 500 proceeds to operation 512.

Next, an optional order operation 512 orders the row-by-row expressions. In embodiments of the present invention, the spreadsheet module may order the expressions rather than apply the row-by-row expressions immediately. Ordering may include placing the expressions into an organization that is most efficient for processing. In one embodiment, the order may be from the most restrictive to the least restrictive expression. For example, the expression "C=5" is more restrictive than the expression "C>5" because the first expression has only one possibility, a value equal 5, and the second expression has numerous possibilities, all values above 5. Ordering the expressions is more efficient because applying the more restrictive expressions first can eliminate the row from further processing before applying the less restrictive expressions.

Next, evaluate operation 514 evaluates each row by all the ordered, row-by-row expressions. In embodiments of the present invention, the spreadsheet module applies the parsed, separated, ordered, row-by-row expressions, as a set, to each row individually. The spreadsheet module can evaluate each row either serially or at random. If any expression applies to the row, the data within that row may be eliminated, if necessary. Any expression that has yet to be applied to the eliminated row need not be applied, and the spreadsheet module can move to the next row for evaluation of the expressions. Thus, the row-by-row expressions can operate like an array formula rather than a table formula. While the present embodiment applies the expression row-by-row, it may also be possible to apply expressions column-by-column. Thus, in some embodiments, the separating, ordering, and evaluating may be completed for column-by-column expressions. After the spreadsheet module applies the row-by-row expressions to each row, the spreadsheet module creates a first intermediate data set 516 (such as intermediate set of data 316).

If the determine operation 506 determines the parsed expression is not a row-by-row expression, the process 500 may proceed to optional order operation 518. Order operation 518 may order the "whole table" expressions rather than apply the "whole table" expressions immediately. In some embodiments, the "whole table" expressions can be ordered from most restrictive to least restrictive, as explained above. Other ordering methodologies are completed for both row-by-row expressions and "whole table" expressions because processing of the expressions may be more efficient or effective if some expressions follow other expressions. For example, processing may be more effective if a sort precedes a "take the top ten" operation.

Next, an apply operation 520 applies the "whole table" expressions. In one embodiment, the spreadsheet module retrieves, from memory, the first intermediate data set created by the row-by-row expressions. Then, the spreadsheet module applies the first "whole table" expression. The spreadsheet module creates a subsequent set of intermediate data 522 and stores the subsequent set of intermediate data 522.

Next, determine operation 524 determines if other "whole table" expressions need to be applied. If another "whole table" expression has yet to be applied to a subsequent intermediate data set, the process 500 returns to apply operation 520. If no other "whole table" expression needs to be applied, the last set of subsequent intermediate data 522 stored in memory becomes the output data (such as output data 310).

Referring to receive operation 526, if the underlying input data changes, receive operation 526 receives the change. In one embodiment, a database formula or function may have already been entered within a spreadsheet. The pre-existing database formula or function has a selected set of input data to which the expressions are applied. The stored selection of the set of input data represents "dependencies" of the database formula or database function. A user may change some part of the "dependent" cells that were designated as inputs to a database formula or function. The change to the input data may come from editing the input data, adding to the input data, refreshing the input data, or other actions. If the input data is changed, the process 500 of applying the expressions may start at block 502.

In some embodiments, the spreadsheet module receives the change. When the change effects the input data in the dependent cells, the change results in process 400 being rerun starting at manipulate operation 410. In one embodiment, the database functions are re-evaluated or rerun to return a correct output data set using the changed input data. Thus, database formulas and database functions, unlike database operations, can be recalculated.

Figure 6:
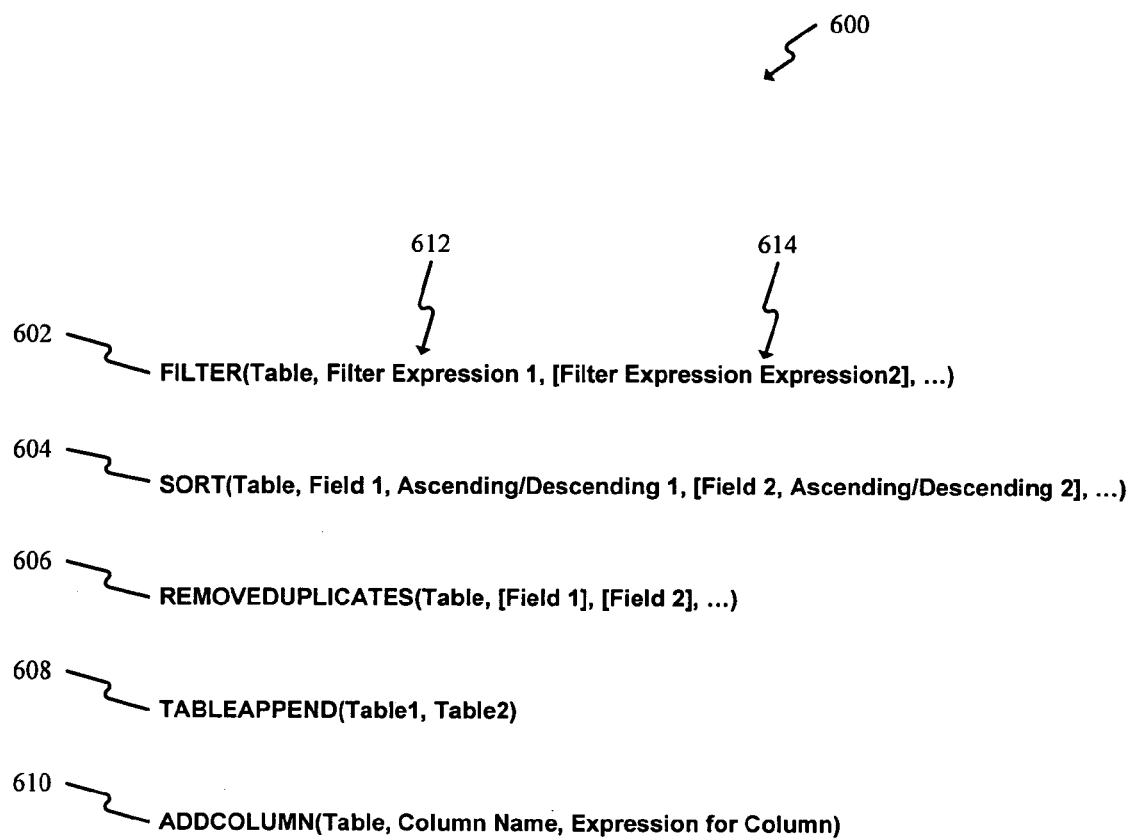
FIG. 6 shows several exemplary embodiments of database functions according to the present invention.

Several exemplary database formulas containing database functions are presented in FIG. 6. The exemplary embodiments include certain syntax, but the invention is not limited to that syntax. Rather, the database formulas and database functions may comprise any type of syntax that can provide the user with repeatable and formulaic-like database operations. In addition, the database formulas and database functions may have any syntax that can provide the user with user-specified customization through the inclusion of one or more arguments within the database formula or database function. In some embodiments, the database formulas and database functions may include semantic designations.

The FILTER database function 602 can remove items of data from a spreadsheet according to one or more arguments. As shown in FIG. 6, the FILTER database function 602 has an exemplary set of expressions, such as expression 612 and expression 614. In embodiments of the present invention, every database function can have expressions or arguments similar to expression 612 and 614. The syntax and operation of the expressions may change depending on the type of database function. One skilled in the art will recognize the exemplary arguments and/or expressions in the set of exemplary database functions.

In embodiments of the present invention, the exemplary FILTER function has a structure and syntax as follows: "FILTER(Table, Filter Expression 1, [Filter Expression Expression2], . . . )." The FILTER database function 602 returns all items (rows) from a set of data that meet all filter conditions as embodied by the arguments. In embodiments of the present invention, the arguments can be algebraic, mathematical, Boolean, or other types of expressions that may contain one or more references to sets of data within the input data. The arguments may be applied, and the FILTER database function 602 returns a list of rows that meet all the arguments. Only items (rows) where all arguments are true are included as a part of the output data.

For example, an exemplary table, shown below, may be called "MyTable." The table follows:

| Foo | Bar |
|-----|-----|
| C | 1 |
| B | 2 |
| C | 3 |
| B | 4 |
| C | 5 |

The FILTER function may be entered into the spreadsheet as the following expressions: =FILTER(MyTable, [Bar]>1, [Foo]="C")

The result of this FILTER function will be the following table:

| Foo | Bar |
|-----|-----|
| C   | 3   |
| C   | 5   |

The FILTER function used semantic references for column tokens, for instance, the FILTER function used the name of the columns "Foo" and "Bar" and the name of the table, "MyTable," which is a named range for the entire table.

Another example of a database function is the SORT function 604, as shown in FIG. 6. In embodiments of the present invention, the exemplary SORT function may have the structure and syntax as follows: "SORT(Table, Field 1, Ascending/Descending 1, [Field 2, Ascending/Descending 2], . . . )." The SORT function 604 returns a table that is the result of sorting the selected data by all specified arguments. The first argument specified is the highest order (last applied) sort, the second argument is the second highest order sort, and so on. Thus, the several sorts are applied in reverse order to the order of appearance of the arguments in the function to produce a properly sorted list.

Another example of a database function may be the REMOVE DUPLICATES function 606 shown in FIG. 6. In embodiments of the present invention, the REMOVE DUPLICATES function 606 may have a structure and syntax as follows: "REMOVEDUPLICATES(Table, [Field 1], [Field 2], . . . )." The REMOVE DUPLICATES function 606 can return a set of data that does not contain any duplicate items expressed by any of the arguments. If all specified items identifies by the arguments match with those of another item, then the REMOVE DUPLICATES function 606 may return only one of the two items. In some embodiments, the REMOVE DUPLICATES function 606 may return the "first" item (the item positioned nearer the top the table). If the set of data does not include any data that is a duplicate, then no data is removed.

As an example, the selected data, shown below, is called "MyTable":

| Foo | Bar |
|-----|-----|
| A   | 1   |
| B   | 2   |
| C   | 3   |
| B   | 2   |
| C   | 5   |

The example REMOVE DUPLICATES function 606 is shown below: =REMOVEDUPLICATES(MyTable, [Foo], [Bar]).

The REMOVE DUPLICATES function 606 returns a set of output data as follows:

| Foo | Bar |
|-----|-----|
| A   | 1   |
| B   | 2   |
| C   | 3   |
| C   | 5   |

Still another example of a database function is the TABLE APPEND function 608 shown in FIG. 6. In embodiments of the present invention, the TABLE APPEND function 608 has a structure and syntax as follows: "TABLEAPPEND(Table1, Table2)." This TABLE APPEND function 608 returns a set of data that contains all items from Table1 and Table2. In one embodiment, the output data has an order of all fields from Table1 followed by all fields from Table2 that are not in Table1. In another embodiment, when one table has one or more fields that the other Table does not, those fields may not be included. The TABLEAPPEND function 608 may append data to the top, bottom, or sides of one or the other table.

A final example of a database function may be the ADD COLUMN function 610 shown in FIG. 6. In embodiments of the present invention, the ADD COLUMN function 610 may have the a structure and syntax as follows: "ADDCOLUMN (Table, Column Name, Expression for Column)." The ADD COLUMN function 610 can create a set of data that is the same as in "table" but also contains a column whose name is "column name" and whose data values are the result of the argument called "expression for column". The ADD COLUMN function 610 may be applied row by row. The ADD COLUMN function 610 may have multiple arguments. In some embodiments, the multiple arguments in the ADD COLUMN function 610 may function similar to the FILTER function.

What is claimed is:

1. A computer-implemented method for manipulating a table of data in a spreadsheet application, the method comprising:
   receiving one or more database functions within a cell of the spreadsheet application;
   receiving a selection for input data comprising one or more cells of the table of data, wherein the input data resides within the spreadsheet application;
   manipulating the input data according to the one or more database functions, wherein manipulating comprises:
      determining that the one or more database functions can be applied row-by-row; and
      applying the determined database functions to each row separately, wherein prior to applying the determined database functions, the determined database functions are ordered based on processing efficiency; and
   presenting output data in the spreadsheet application, wherein the output data is anchored in the cell in which the one or more database functions are received, wherein the output data is presented as an array of data comprising more than one cell of the spreadsheet application, and wherein the array is separate from the table of data.

2. A method according to claim 1, wherein one or more of the database functions includes one or more arguments.

3. A method according to claim 2, wherein the one or more arguments include a semantic reference.

4. A method according to claim 2, wherein the user provides the one or more arguments.

5. A method according to claim 1, wherein the input data is a table of data.

6. A method according to claim 1, wherein the output data is a table of data.

7. A method according to claim 1, wherein presenting the output data causes one more or more items of pre-existing data to move.

8. A method according to claim 1, wherein the database function is one of a filter function, a sort function, a remove duplicates function, a table append function, or a add column function.

9. A method according to claim 8, wherein the filter function further comprises:
  comparing at least one item of data to a filter argument; and
  returning output data without any item from the input data that meets a filter argument.

10. A method according to claim 8, wherein the sort function further comprises:
  returning an organized set of output data according to one or more sort arguments.

11. A method according to claim 8, wherein the duplicate removal function further comprises:
  determining that two items of data in the input data, designated in an argument, are the same;
  returning output data, wherein one of the two items of like data are removed.

12. A method according to claim 8, wherein the table append function further comprises:
  retrieving two sets of input data;
  returning output data, wherein at least a portion of the first set of input data is appended to at least a portion of the second set of input data.

13. A method according to claim 8, wherein the column add function further comprises:
  creating a column of data from the input data according to one or more arguments;
  returning output data, wherein the output data includes the input data and the column of data.

14. A method according to claim 1, further comprising receiving one or more arguments with the one or more database functions and wherein manipulating the input data further comprises:
  determining that the one or more arguments can be applied row-by-row;
  applying the determined arguments to each row separately, wherein prior to applying the determined arguments, the determined arguments are ordered based on processing efficiency; and
  applying any remaining arguments or database functions.

15. A method according to claim 14, wherein a first intermediate set of data is created from applying the arguments and database functions to each row separately.

16. A method according to claim 15, wherein one or more subsequent intermediate sets of data are created because of each remaining argument or database function applied to the first intermediate set of data or to one or more of the subsequent intermediate sets of data.

17. A computer storage medium having computer-executable instructions for performing steps comprising:
  receiving one or more database functions within a cell of a spreadsheet application;
  receiving a selection for input data comprising one or more cells of the table of data,
  wherein the input data resides within the spreadsheet application;
  manipulating the input data according to the one or more database functions, wherein manipulating comprises:
    determining that the one or more database functions can be applied row-by-row; and
    applying the determined database functions to each row separately, wherein prior to applying the determined database functions, the determined
  database functions are ordered based on processing efficiency; and
  presenting output data in the spreadsheet application, wherein the output data is anchored in the cell in which the one or more database functions are received, wherein the output data is presented as an array of data comprising more than one cell of the spreadsheet application, and wherein the array is separate from the table of data.

18. A computer storage medium according to claim 17, wherein one or more of the database functions includes one or more arguments.

19. A computer storage medium according to claim 18, wherein the one or more arguments include a semantic reference.

20. A computer storage medium according to claim 18, wherein the user provides the one or more arguments.

21. A computer storage medium according to claim 17, wherein the input data is a table of data.

22. A computer storage medium according to claim 17, wherein the output data is a table of data.

23. A computer storage medium according to claim 17, wherein presenting the output data causes one more or more items of pre-existing data to move.

24. A computer storage medium according to claim 17, wherein the database function is one of a filter function, a sort function, a remove duplicates function, a table append function, or a add column function.

25. A computer storage medium according to claim 24, wherein the filter function further comprises:
  comparing at least one item of data to a filter argument; and
  returning output data without any item from the input data that meets a filter argument.

26. A computer storage medium according to claim 24, wherein the sort function further comprises:
  returning an organized set of output data according to one or more sort arguments.

27. A computer storage medium according to claim 24, wherein the duplicate removal function further comprises:
  determining that two items of data in the input data, designated in an argument, are the same;
  returning output data, wherein one of the two items of like data are removed.

28. A computer storage medium according to claim 24, wherein the table append function further comprises:
  retrieving two sets of input data;
  returning output data, wherein at least a portion of the first set of input data is appended to at least a portion of the second set of input data.

29. A computer storage medium according to claim 24, wherein the column add function further comprises:
  creating a column of data from the input data according to one or more arguments;
  returning output data, wherein the output data includes the input data and the column of data.

30. A computer storage medium according to claim 17, further comprising receiving one or more arguments with the one or more database functions and
  wherein manipulating the input data further comprises:
    determining that the one or more arguments can be applied row-by-row;
    applying the determined arguments to each row separately, wherein prior to applying the determined arguments, the determined arguments are ordered based on processing efficiency; and
  applying any remaining arguments or database functions.

31. A computer storage medium according to claim 30, wherein a first intermediate set of data is created from applying the arguments and database functions to each row separately.

32. A computer storage medium according to claim 31, wherein one or more subsequent intermediate sets of data are created because of each remaining argument or database function applied to the first intermediate set of data or to one or more of the subsequent intermediate sets of data.

33. A system for manipulating a table of data in a spreadsheet application, comprising:
- a processor;
- a memory, communicatively coupled to the processor and including instructions that, when executed by the processor, perform the following method:
  - receiving a selection of one of one or more database functions, including one or more arguments, wherein the one or more database functions are received within a cell of the spreadsheet application;
  - receiving a selection of input data comprising one or more cells of the table of data, wherein the input data resides within the spreadsheet application;
  - parsing out the one or more arguments and the one or more database functions;
  - determining that one or more arguments or one or more database functions can be applied row-by-row;
  - applying the determined arguments and database functions to each row separately, wherein prior to applying the arguments or database functions, the arguments or functions are ordered based on processing efficiency;
  - applying any remaining arguments or database functions; and
  - presenting output data in the spreadsheet application, wherein the output data is anchored in the cell in which the one or more database functions are received, wherein the output data is presented as an array of data comprising more than one cell of the spreadsheet application, and wherein the array is separate from the table of data.

34. A system according to claim 33, wherein a first intermediate set of data is created from applying the arguments and database functions to each row separately.

35. A system according to claim 34, wherein one or more subsequent intermediate sets of data are created because of each remaining argument or database function applied to the first intermediate set of data or to one or more of the subsequent intermediate sets of data.

36. A computer storage medium having computer-executable instructions for performing steps comprising:
- receiving a selection of one of one or more database functions, including one or more arguments, wherein the one or more database functions are received within a cell of the spreadsheet application;
- receiving a selection of input data comprising one or more cells of the spreadsheet application, wherein the input data resides within the spreadsheet application;
- parsing out the one or more arguments and the one or more database functions;
  - determining that one or more arguments can be applied row-by-row to the selection of input data;
- applying the determined arguments to each row separately, wherein prior to applying the determined arguments, the determined arguments are ordered based on processing efficiency;
- applying any remaining arguments; and
- presenting the output data in the spreadsheet, wherein the output data is anchored in the cell in which the one or more database functions are received, wherein the output data is presented as an array of data comprising more than one cell of the spreadsheet application, and wherein the array is separate from the table of data.

37. A computer storage medium according to claim 36, wherein a first intermediate set of data is created from applying the arguments and database functions to each row separately.

38. A computer storage medium according to claim 37, wherein one or more subsequent intermediate sets of data are created because of each remaining argument or database function applied to the first intermediate set of data or to one or more of the subsequent intermediate sets of data.

39. In a computer system having a graphical user interface including a display device and a user interface selection device, a computer-implemented method of receiving one or more database functions to apply to a set of input data, comprising the steps of:
- receiving a selection of input data comprising one or more cells of the spreadsheet application, wherein the input data resides within a spreadsheet application;
- receiving one or more database functions to apply to the selection of input data, wherein the one or more database function are received in one or more cells of the spreadsheet application;
- determining that the one or more database functions can be applied row-by-row to the selection of input data; and
- separately applying the one or more database functions to each row of the selection of input data, wherein prior to separately applying the one or more database functions, the one or more database functions are ordered based on processing efficiency; and
- displaying output data after the one or more database functions have been applied to the input data, wherein the output data is displayed in a spreadsheet application and anchored in the one or more cells of the spreadsheet application that received the one or more database functions, wherein the output data is presented as an array of data comprising more than one cell of the spreadsheet application, and wherein the array is separate from the table of data.

40. A method according to claim 39, further comprising receiving one or more arguments with the one or more database functions, wherein the arguments adjust how the database functions are applied.

41. A method according to claim 40, wherein one or more of the arguments includes a column token.

42. A method according to claim 40, wherein one or more of the arguments includes a mathematical expression.

43. A method according to claim 40, wherein one or more of the arguments is semantic.

44. A method according to claim 39, wherein two or more of the database functions are received as embedded database formulas.

45. A method according to claim 39, wherein the output data occupies two or more cells in the spreadsheet.

* * * * *